US010476577B1

(12) United States Patent
Wang et al.

(10) Patent No.: US 10,476,577 B1
(45) Date of Patent: Nov. 12, 2019

(54) USER EQUIPMENT-INITIATED BEAM SEARCH FOR FIFTH GENERATION NEW RADIO

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/180,972

(22) Filed: Nov. 5, 2018

(51) Int. Cl.
*H04B 7/06* (2006.01)
*H04B 7/0417* (2017.01)

(52) U.S. Cl.
CPC ......... *H04B 7/0695* (2013.01); *H04B 7/0417* (2013.01)

(58) Field of Classification Search
CPC .......................... H04B 7/0695; H04B 7/0417
See application file for complete search history.

(56) References Cited

U.S. PATENT DOCUMENTS

| 10,278,227 | B2 | 4/2019 | Wang et al. | |
|---|---|---|---|---|
| 2013/0051364 | A1* | 2/2013 | Seol | H04W 16/28 370/331 |
| 2015/0181485 | A1* | 6/2015 | Son | H04W 36/0055 455/436 |
| 2018/0041949 | A1* | 2/2018 | Liu | H04W 48/16 |
| 2018/0049141 | A1 | 2/2018 | Choi et al. | |
| 2018/0191417 | A1* | 7/2018 | Kim | H04B 7/04 |
| 2018/0220416 | A1 | 8/2018 | Islam et al. | |
| 2018/0302136 | A1* | 10/2018 | Wigren | H04B 7/0617 |
| 2019/0090143 | A1 | 3/2019 | Luo et al. | |

FOREIGN PATENT DOCUMENTS

WO   2018201913   11/2018

OTHER PUBLICATIONS

Giordani, et al., "Standalone and Non-Standalone Beam Management for 3GPP NR at mmWaves", IEEE; arXiv:1805.04268v1 [cs.N1], May 11, 2018, 7 pages.

* cited by examiner

*Primary Examiner* — Freshteh N Aghdam
(74) *Attorney, Agent, or Firm* — Colby Nipper PLLC

(57) ABSTRACT

This document describes methods, devices, systems, and means for user equipment-initiated beam search for fifth generation new radio. A user equipment (110) determines that a first beam being used for wireless communication between the user equipment (110) and a base station (121) is unsatisfactory for communication. The user equipment (110) transmits uplink beam-scan pilots that cause the base station (121) to select a second beam for wireless communication. The user equipment (110) receives a beam scan response message from the base station (121) and establishes wireless communication with the base station (121) on a second beam based on information included in the received beam scan response message.

24 Claims, 7 Drawing Sheets

USER EQUIPMENT-INITIATED BEAM SEARCH FOR FIFTH GENERATION NEW RADIO

BACKGROUND

The evolution of wireless communication to fifth generation (5G) standards and technologies provides higher data rates and greater capacity, with improved reliability and lower latency, which enhances mobile broadband services. 5G technologies also provide new classes of services for vehicular, fixed wireless broadband, and the Internet of Things (IoT).

A unified air interface, which utilizes licensed, unlicensed, and shared license radio spectrum, in multiple frequency bands, is one aspect of enabling the capabilities of 5G systems. The 5G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband.

To increase the capacity of 5G radio networks, Multiple Input Multiple Output (MIMO) antenna systems support beamformed signals transmitted between base stations and user equipment (UE). In 5G networks, base stations employ a large number of MIMO antennas (e.g., hundreds of antennas) for beamforming signals, which is often referred to as Massive MIMO, to provide beamformed transmission and reception that is focused on small areas of space around individual UE. Massive MIMO beamforming improves network throughput, energy efficiency, and interference rejection. Massive MIMO systems use a channel estimate of the radio frequency (RF) channel characteristics between the base station and the user equipment to determine beamforming coefficients for transmission and reception.

The specification of the features in the 5G air interface for user equipment is defined as 5G New Radio (5G NR). Improvements in beamforming for 5G NR are particularly important at mmWave frequencies where changing channel conditions make it challenging for the UE and a base station to track a beam between the UE and the base station. Synchronization of the beamforming between the UE and the base station in 5G NR is based on broadcast synchronization using cell-specific reference signals that are transmitted periodically by a base station, or the base station may periodically sweep across a set of beams so that the UE can track the base station. Dependence on the periodic broadcasts from a base station limits how quickly the UE can react to changing channel conditions to maintain a communication link with the base station.

SUMMARY

This summary is provided to introduce simplified concepts of user equipment-initiated beam search for fifth generation new radio. The simplified concepts are further described below in the Detailed Description. This summary is not intended to identify essential features of the claimed subject matter, nor is it intended for use in determining the scope of the claimed subject matter.

In some aspects, a method for beam-searching for a fifth-generation new radio (5G NR) communication link between a user equipment (UE) and a base station is described in which the user equipment determines that a first beam being used for wireless communication between the user equipment and the base station is unsatisfactory for communication, and the user equipment transmits uplink beam-scan pilots that cause the base station to select a second beam for wireless communication. After transmitting the uplink beam-scan pilots, the UE receives a beam scan response message from the base station and, based on information included in the received beam scan response message, establishes wireless communication with the base station on the second beam.

In another aspect, a user equipment (UE) includes a radio frequency (RF) transceiver, an antenna array coupled to the RF transceiver, and a processor and memory system to implement a beam search manager application that determines that a first beam being used for wireless communication between the user equipment and a base station is unsatisfactory for communication. The user equipment transmits uplink beam-scan pilots that cause the base station to select a second beam for wireless communication. The user equipment receives a beam scan response message indicating the second beam and, based on information included in the received beam scan response message, establishes wireless communication with the base station on the second beam.

In a further aspect, a method for beam-searching for a fifth-generation new radio (5G NR) communication link between a base station and a user equipment (UE) is described in which the base station broadcasts an indicator for a pattern of pilot signals for uplink beam-scan pilots and receives the uplink beam-scan pilots from the user equipment. Using the received uplink beam-scan pilots, the base station selects a beam for wireless communication between the user equipment and the base station. The base station transmits a beam scan response message, including information that is usable by the user equipment to communicate with the base station using the beam, and establishes wireless communication with the user equipment via the beam.

BRIEF DESCRIPTION OF THE DRAWINGS

Aspects of user equipment-initiated beam search for fifth generation new radio are described with reference to the following drawings. The same numbers are used throughout the drawings to reference like features and components.

DETAILED DESCRIPTION

Figure 1:
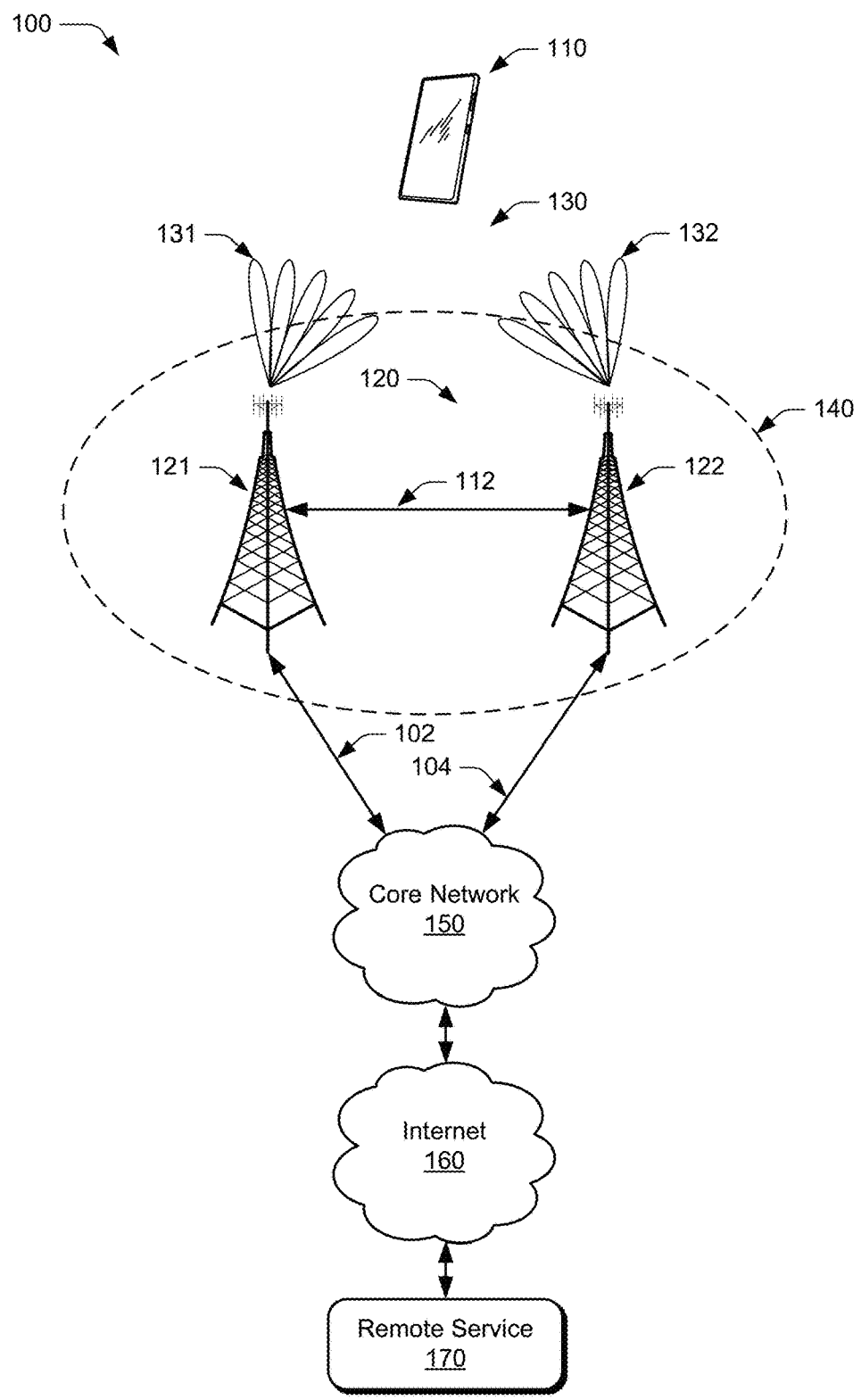
FIG. 1 illustrates an example wireless network system in which various aspects of user equipment-initiated beam search for fifth generation new radio can be implemented.

This document describes methods, devices, systems, and means for user equipment-initiated beam search for fifth generation new radio. A user equipment (UE) determines that a first beam being used for wireless communication between the user equipment and a base station is unsatisfactory for communication. The user equipment transmits uplink beam-scan pilots that cause the base station to select a second beam for wireless communication. The user equipment receives a beam scan response message from the base station and establishes wireless communication with the base station on a second beam based on information included in the received beam scan response message.

As wireless communication systems evolve to fifth generation (5G) New Radio (5G NR) technologies, 5G networks will be deployed in parallel with existing Long Term Evolution (LTE) networks. 5G NR networks increase network capacity by adding new spectrum and utilizing beamforming techniques to optimize for the wireless communication channel between the base station and the user equipment (UE).

One challenge in utilizing beamforming techniques is that changing wireless channel conditions and user equipment mobility may affect the quality of a beam used for communication between a base station and the user equipment. Using conventional techniques, when a UE determines that the communication performance of a current beamformed downlink beam has degraded, the UE waits until it receives Synchronization Signal Blocks (SSBs) from the base station to search for a good beam to use for continued communication. The UE communicates the newly selected beam to the base station using Radio Resource Control (RRC) signaling via preconfigured resources, such as a Random Access Channel (RACH) resource. Dependence on the scheduled transmission of the SSBs by the base station limits how quickly the user equipment can adjust to changing channel conditions.

The base stations in the 5G NR network determine the timing of reference signal transmission and schedule transmission of the cell-specific reference signals. In the radio spectrum above 6 GHz, including millimeter wave (mmWave) frequency bands, a base station can support Multiple Input Multiple Output (MIMO) antenna systems with a large number of beams (e.g., 64, 128, or 256 beams). Transmitting a beam sweep on a large number of beams consumes significant air interface resources and time.

Scheduling transmission of the cell-specific reference signals for a beam search by the base station limits the ability of user equipment to adjust to changing channel conditions between the periodic broadcasts of the cell-specific reference signals. Enabling the user equipment to initiate a beam search in response to changing channel conditions can reduce the time needed to establish or reestablish communication using an effective beam.

The broadcast of cell-specific reference signals for a beam search may create interference in adjacent cells. In the mmWave radio spectrum, the geographic area of a cell is smaller than cells in lower radio-frequency bands. A cell in the mmWave frequency band may serve a few, a single, or no UEs at any given time. When there are no UEs in a cell, the on-going broadcast of beam search signals creates adjacent-cell interference and reduces the efficiency of resource utilization in the wireless network. The use of UE-initiated beam searches uses resources in a cell only when there is a need for a UE to perform a beam search procedure, thus reducing interference with adjacent cells.

A base station supporting Multiple Input Multiple Output (MIMO) antenna systems includes digital signal processing and beamforming circuitry to support a large number of beams (e.g., 64, 128, or 256 beams). By comparison, a UE has limited beamforming capability (e.g., 8 analog phase shifters per phase array) that limits the number and width of the beams the UE can form. In a conventional beam search procedure, the UE is required to perform a significant amount of processing to evaluate downlink beams transmitted by a base station. Using a UE-initiated beam search, the UE transmits uplink beams that are evaluated by the base station. The base station communicates feedback from the beam search to the UE to enable the UE to select a beam for communication with the base station. By using uplink beams, the processing for evaluation of the beam search is performed using the greater processing power of the base station and reduces the processing load on the UE.

While features and concepts of the described systems and methods for user equipment-initiated beam search for fifth generation new radio can be implemented in any number of different environments, systems, devices, and/or various configurations, aspects of user equipment-initiated beam search for fifth generation new radio are described in the context of the following example devices, systems, and configurations.

Example Environment

FIG. 1 illustrates an example environment 100 in which various aspects of user equipment-initiated beam search for fifth generation new radio can be implemented. The example environment 100 includes a user equipment 110 (UE 110) that communicates with one or more base stations 120 (illustrated as base stations 121 and 122), through one or more wireless communication links 130 (wireless link 130), illustrated as wireless links 131 and 132. In this example, the user equipment 110 is implemented as a smartphone. Although illustrated as a smartphone, the user equipment 110 may be implemented as any suitable computing or electronic device, such as a mobile communication device, a modem, cellular phone, gaming device, navigation device, media device, laptop computer, desktop computer, tablet computer, smart appliance, or vehicle-based communication system. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof.

The base stations 120 communicate with the user equipment 110 via the wireless links 131 and 132, which may be implemented as any suitable type of wireless link. The wireless links 131 and 132 can include a downlink of data and control information communicated from the base stations 120 to the user equipment 110, an uplink of other data and control information communicated from the user equipment 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the user equipment 110. Multiple wireless links 130 from multiple base stations 120 may be configured for Coordinated Multipoint (CoMP) communication with the user equipment 110. Additionally, multiple wireless links 130 may be configured for single-radio access technology (RAT) (single-RAT) dual connectivity or multi-RAT dual connectivity (MR-DC).

The base stations 120 are collectively a Radio Access Network 140 (RAN, Evolved Universal Terrestrial Radio Access Network, E-UTRAN, 5G NR RAN or NR RAN). The base stations 121 and 122 in the RAN 140 are connected to a core network 150, such as a Fifth Generation Core (5GC) network. The base stations 121 and 122 connect, at 102 and 104 respectively, to the core network 150 via an NG2 interface for control-plane signaling and via an NG3 interface for user-plane data communications. In addition to connections to core networks, base stations 120 may communicate with each other via an Xn Application Protocol (XnAP), at 112, to exchange user-plane and control-plane data. The user equipment 110 may also connect, via the 5GC 150, to public networks, such as the Internet 160 to interact with a remote service 170.

Example Devices

Figure 2:
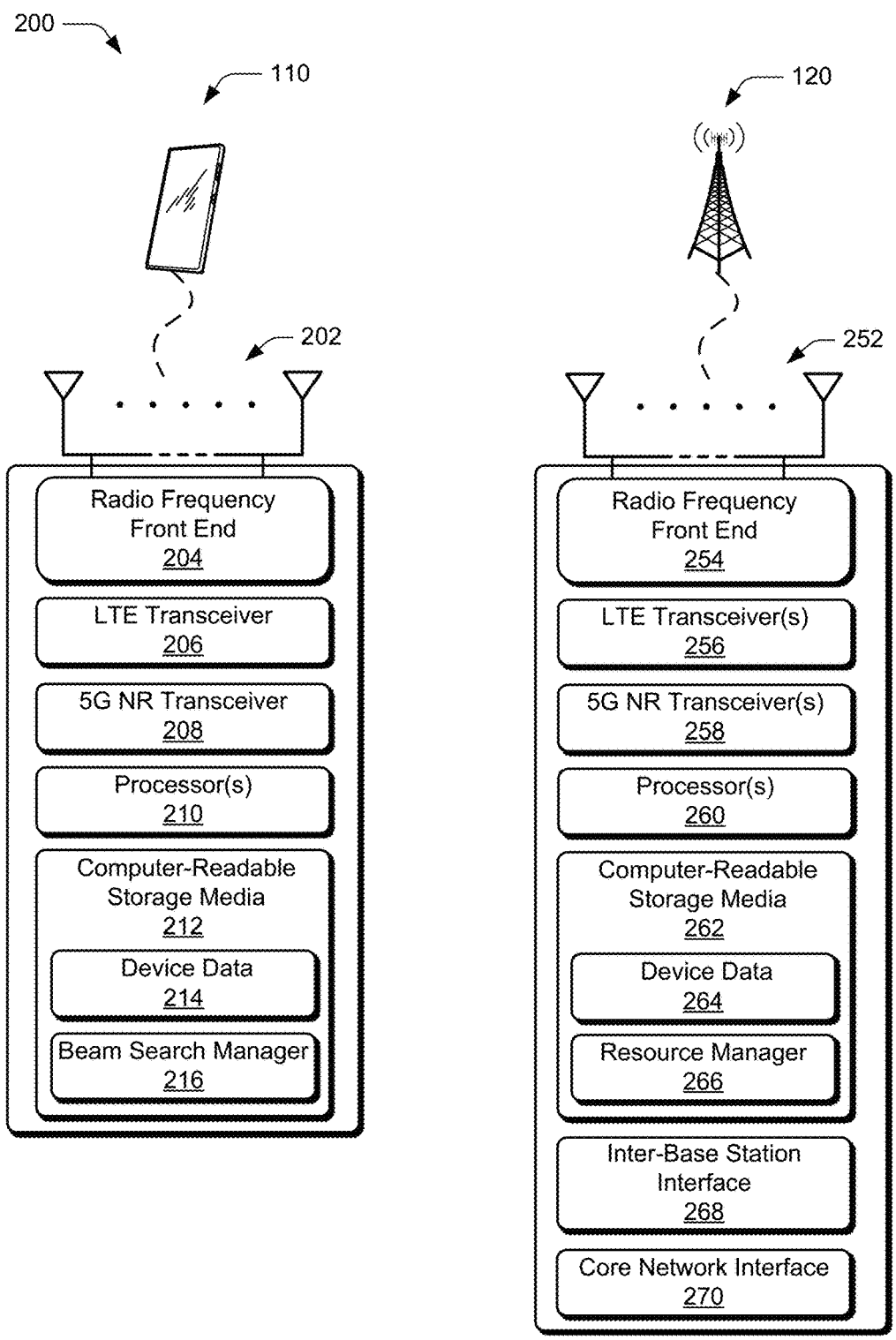
FIG. 2 illustrates an example device diagram that can implement various aspects of user equipment-initiated beam search for fifth generation new radio.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, and a 5G NR transceiver 208 for communicating with base stations 120 in the RAN 140. The RF front end 204 of the user equipment 110 can couple or connect the LTE transceiver 206, and the 5G NR transceiver 208 to the antennas 202 to facilitate various types of wireless communication. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The user equipment 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, and/or an operating system of the user equipment 110, which are executable by processor(s) 210 to enable user-plane communication, control-plane signaling, and user interaction with the user equipment 110.

In some implementations, the CRM 212 may also include a beam search manager 216. The beam search manager 216 can communicate with the antennas 202, the RF front end 204, the LTE transceiver 206, and/or the 5G NR transceiver 208 to monitor the quality of the wireless communication links 130 and initiate a beam search based on the monitored quality of the wireless communication links 130.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the user equipment 110.

CRM 262 also includes a resource manager 266. Alternately or additionally, the resource manager 266 may be implemented in whole or part as hardware logic or circuitry integrated with or separate from other components of the base stations 120. In at least some aspects, the resource manager 266 configures the LTE transceivers 256 and the 5G NR transceivers 258 for communication with the user equipment 110, as well as communication with a core network, such as the core network 150. Additionally, the resource manager 266 may negotiate with the user equipment 110 to determine resources for use by the UE 110 for a user equipment-initiated beam search.

The base stations 120 include an inter-base station interface 268, such as an Xn and/or X2 interface, which the resource manager 266 configures to exchange user-plane and control-plane data between other base stations 120, to manage the communication of the base stations 120 with the user equipment 110. The base stations 120 include a core network interface 270 that the resource manager 266 configures to exchange user-plane and control-plane data with core network functions and/or entities.

Figure 3:
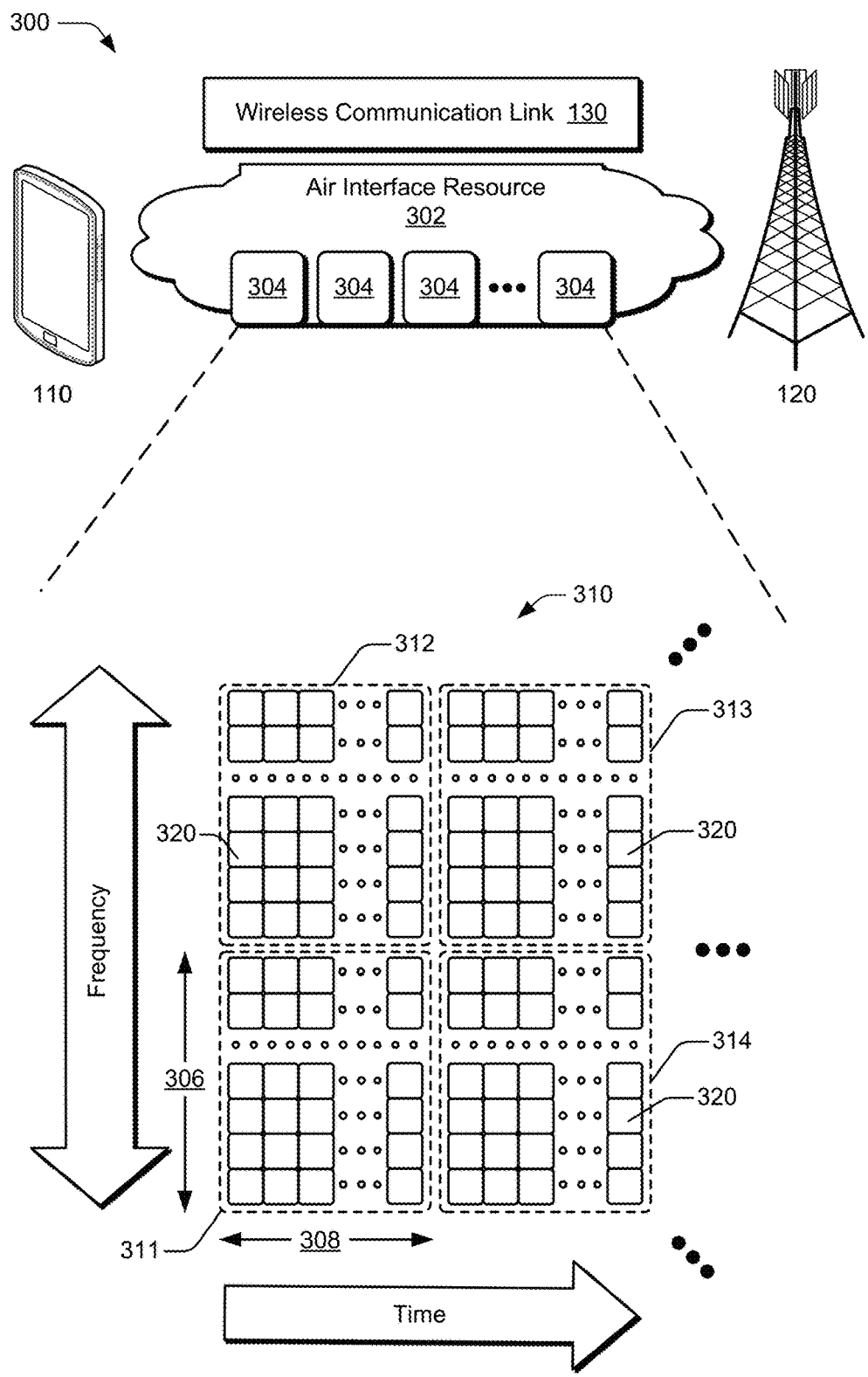
FIG. 3 illustrates an air interface resource that extends between a user equipment and a base station and with which various aspects of user equipment-initiated beam search for fifth generation new radio techniques can be implemented.

FIG. 3 illustrates an air interface resource that extends between a user equipment and a base station and with which various aspects of user equipment-initiated beam search for fifth generation new radio can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The resource manager 266 (shown in FIG. 2) may determine a respective data-rate, type of information, or amount of information (e.g., data or control information) to be communicated (e.g., transmitted) by the user equipment 110. For example, the resource manager 266 can determine that each user equipment 110 is to transmit at a different respective data rate or transmit a different respective amount of information. The resource manager 266 then allocates one or more resource blocks 310 to each user equipment 110 based on the determined data rate or amount of information.

Additionally or in the alternative to block-level resource grants, the resource manager 266 may allocate resource units at an element-level. Thus, the resource manager 266 may allocate one or more resource elements 320 or individual subcarriers to different user equipment 110. By so doing, one resource block 310 can be allocated to facilitate network access for multiple user equipment 110. Accordingly, the resource manager 266 may allocate, at various granularities, one or up to all subcarriers or resource elements 320 of a resource block 310 to one user equipment 110 or divided across multiple user equipment 110, thereby enabling higher network utilization or increased spectrum efficiency.

The resource manager 266 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the resource manager 266 can transmit respective messages to the multiple user equipment 110 indicating the respective allocation of resource units 304 to each user equipment 110. Each message may enable a respective user equipment 110 to queue the information or configure the LTE transceiver 206, the 5G NR transceiver 208, or both to communicate via the allocated resource units 304 of the air interface resource 302.

User Equipment-Initiated Beam Scan

In aspects, user equipment-initiated, uplink beam scans are described with which the user equipment 110 autonomously determines when to transmit beam scan pilots to the base station 121 to select a new beam for communication. The user equipment 110 determines that the performance of a currently-used beam on a radio frequency (RF) carrier has become unsatisfactory. For example, the UE 110 determines that one or more link quality parameters (e.g., a received signal strength indication (RSSI), a bit error rate, a frame error rate, a signal-to-noise ratio, a packet retransmission rate, or the like) exceed a threshold that indicates that the communication performance of the beam has degraded.

The user equipment 110 then transmits a burst or group of uplink beam scan pilots for a number of potential beams on the RF carrier in a predetermined pattern to the base station 121. The pattern of air interface resources for the uplink beam scan pilots may be negotiated between the UE 110 and the base station 121 using RRC signaling, or the base station 121 may preallocate resources for the uplink beam scan pilots and transmit the pattern in a broadcast message. The RRC signaling or broadcast message may be communicated on a different RF carrier or using a different RAT (e.g., LTE) than the 5G NR RF carrier used for the beam-formed communication.

The pattern for the uplink beam scan pilots includes time with periodicity, frequency, and a sequence of beams used for the uplink beam scan pilots. The uplink beam scan pilots may be transmitted periodically by the UE 110 as specified in the pattern. Each uplink beam scan pilot burst may correspond to a particular transmit beam and/or transmit subarray transmitted by the user equipment 110 during the user equipment-initiated beam search.

The user equipment 110 may transmit the uplink beam scan pilots at a maximum transmit power of the UE 110 to enable faster acquisition of the beam scan pilots by the base station 121. The uplink beam scan pilots may also be configured in a pattern that is short and transmitted with a low duty cycle to minimize interference caused by the uplink beam scan pilots. The user equipment 110 may request a UE-specific beam scan pilot pattern based on the capabilities of the UE 110 (e.g., maximum transmit power, beam-shaping capabilities, available battery power, or the like).

As discussed above, once the UE 110 has determined that the link quality of the currently-used beam is unsatisfactory, the UE 110 transmits uplink beam scan pilots. The UE 110 can transmit the uplink beam scan pilots autonomously or the UE 110 can transmit an uplink scan request to the base station 121 preceding the uplink beam scan pilots. The uplink scan request can be transmitted as a RACH transmission using uplink beam scan-specific resources (e.g., time, frequency, sequence) on a Physical Random Access Channel (PRACH). When the UE 110 transmits the uplink scan request, followed by the uplink beam scan pilots, there is a timing relationship between the transmission of the uplink scan request and the uplink beam scan pilots, which is known by the user equipment 110 and the base station 121. The uplink scan request can be transmitted on a different RF carrier or RAT than the carrier or RAT of the currently-used beam. For example, the currently-used beam may be in the mmWave band and the uplink scan request may be transmitted in a different 5G NR frequency band or via an LTE carrier, such as a supplemental uplink. Optionally or additionally, such as in the case of dual connectivity, the uplink scan request may be transmitted to another base station, such as the base station 122 and forwarded to the base station 121, via the link 112.

The base station 121 receives the uplink beam scan pilots from the user equipment 110. The base station 121 evaluates the received beam scan pilots and selects a new beam for communication with the user equipment 110. For example, the base station 121 may select the beam with the largest signal strength as the new beam, select the first received beam that exceeds a signal strength threshold as the new beam, or use any suitable criteria to select the new beam. The base station 121 transmits a beam scan response message to the UE 110 that includes the information needed by the user equipment 110 to resume or establish an RRC connection and an indication of the new beam to use on the RF carrier. The base station 121 transmits the beam scan response message to the user equipment 110 at a deterministic time offset after the reception of the uplink beam scan pilots by the base station 121. Optionally or additionally, such as in the case of dual connectivity, the beam scan response message may be transmitted to the user equipment 110 via another base station, such as the base station 122 via the link 112. The beam scan response message may be communicated on a different RF carrier or using a different RAT (e.g., LTE) than the 5G NR carrier used for the beam-formed transmissions.

In an aspect, user equipment-initiated beam search for fifth generation new radio can be used as a compliment to conventional beam search procedures that use scheduled broadcasts of SSBs from the base station 121. For example, the user equipment 110 may initially establish a beam for communication with the base station 121 using a downlink beam search procedure, and if the link quality of a beam established using the downlink beam search procedure drops below an acceptable level, the user equipment 110 can transmit uplink beam scan pilots and/or the uplink scan request to reestablish beam-formed communication.

In another aspect, user equipment-initiated beam search for fifth generation new radio can be used in place of conventional beam search procedures. For example, the base station 121 may preallocate a pattern of resources for the uplink beam scan pilots and transmit the pattern in a broadcast message. Any user equipment 110 establishing an RRC connection with the base station 121 can use the preallocated resources to transmit uplink beam scan pilots and, optionally, the uplink scan request to establish beam-formed communication with the base station 121.

Figure 4:
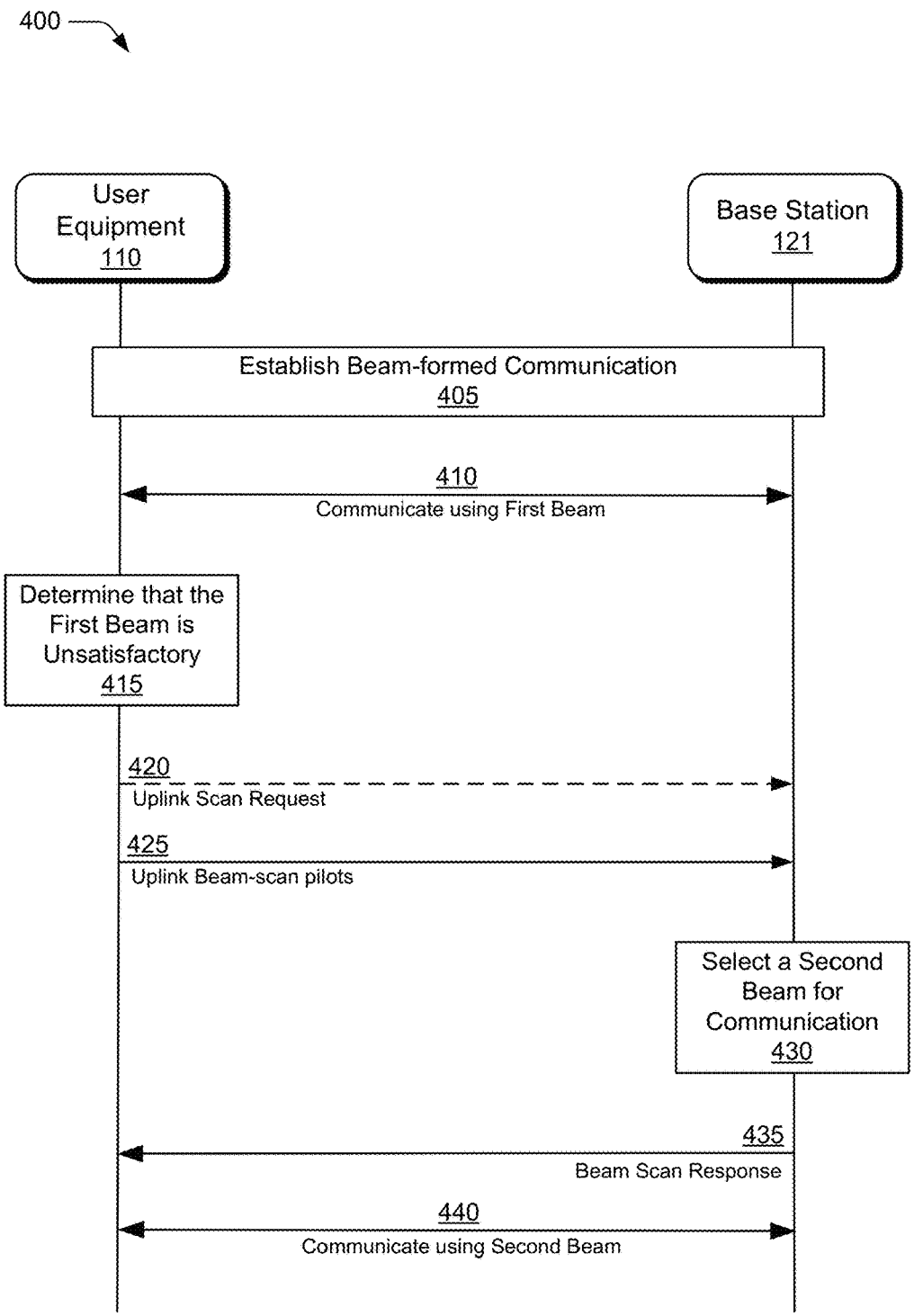
FIG. 4 illustrates an example of data and control transactions between devices in accordance with aspects of user equipment-initiated beam search for fifth generation new radio techniques.

FIG. 4 illustrates an example of data and control transactions 400 between devices in accordance with aspects of user equipment-initiated beam search for fifth generation new radio. The user equipment 110 and the base station 121 establish beam-formed communication using a first beam at 405 and communicate via the first beam at 410.

At 415, the user equipment 110 determines that the first beam is unsatisfactory for communication with the base station 121. For example, the UE 110 determines that one or more link quality parameters (e.g., a received signal strength indication (RSSI), a bit error rate, a frame error rate, a signal-to-noise ratio, a packet retransmission rate, or the like) exceed a threshold that indicates that the communication performance of the beam has degraded. Optionally, at 420, the user equipment 110 transmits an uplink scan request to the base station 121.

At 425, the user equipment 110 transmits uplink beam-scan pilots to the base station 121. For example, as discussed above, the user equipment 110 transmits a burst or group of uplink beam scan pilots for a number of potential beams on the RF carrier in a predetermined pattern to the base station 121. The pattern includes time with periodicity, frequency, and a sequence of beams used for the uplink beam scan pilots.

At 430, the base station evaluates the received uplink beam-scan pilots and selects a second beam for communication with the user equipment. For example, the base station 121 may select the beam with the largest signal strength as the new beam, select the first received beam that exceeds a signal strength threshold as the new beam, or use any suitable criteria to select the new beam. At 435, the base station 121 transmits a beam scan response to the user equipment 110 including information to enable the user equipment to communicate using the second beam. At 440, the user equipment 110 and the base station 121 communicate via the second beam.

Figure 5:
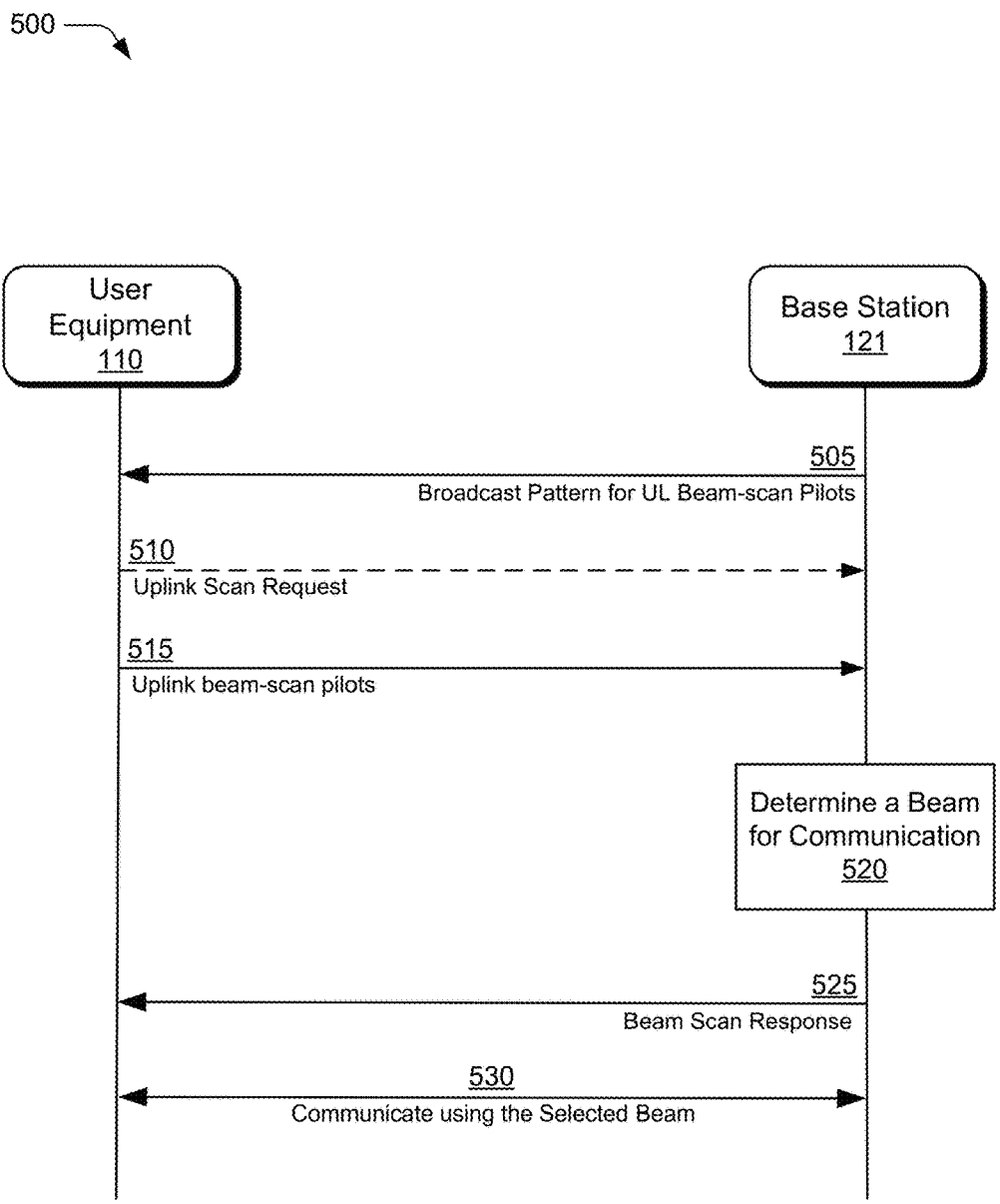
FIG. 5 illustrates an example of data and control transactions between devices in accordance with aspects of user equipment-initiated beam search for fifth generation new radio techniques.

FIG. 5 illustrates an example of data and control transactions 500 between devices in accordance with aspects of user equipment-initiated beam search for fifth generation new radio. At 505, the base station 121 broadcasts a pattern of pilot signals for uplink beam-scan pilots that can be used by any user equipment 110 to establish beam-formed communication with the base station 121. Optionally, at 510, the user equipment 110 transmits an uplink scan request to the base station 121. At 515, the user equipment 110 transmits uplink beam-scan pilots to the base station 121 using the pattern of pilot signals broadcast by the base station 121.

At 520, the base station evaluates the uplink beam-scan pilots and selects a beam for communication with the user equipment. At 525, the base station 121 transmits a beam scan response to the user equipment 110 including information usable by the user equipment to communicate using the beam. At 530, the user equipment 110 and the base station 121 communicate via the beam.

Example Methods

Example methods 600 and 700 are described with reference to FIGS. 6 and 7 in accordance with one or more aspects of user equipment-initiated beam search for fifth generation new radio. The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 6:
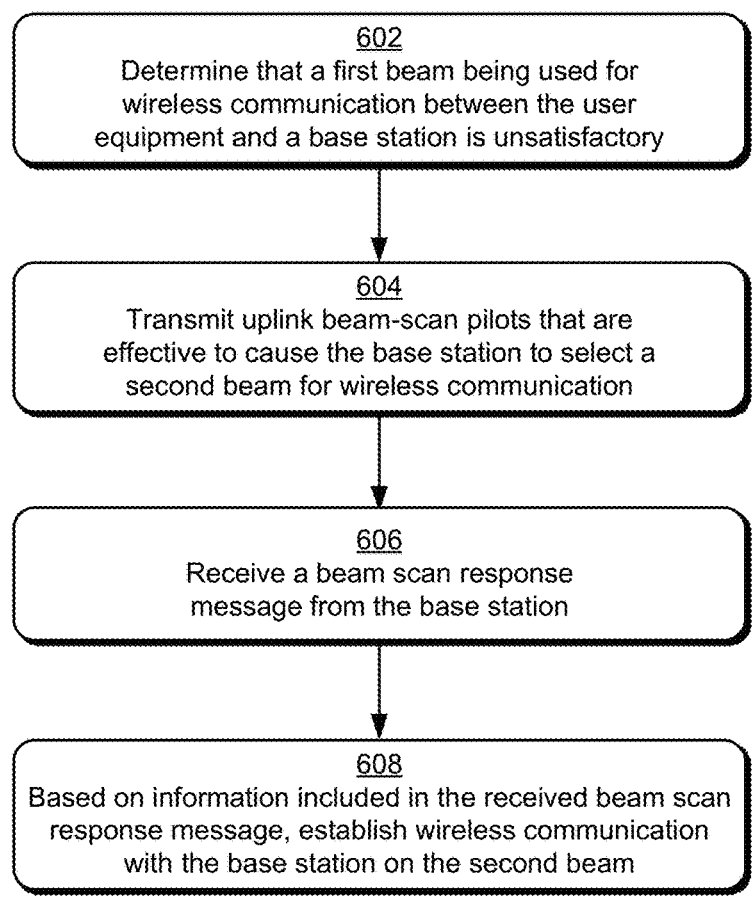
FIG. 6 illustrates an example method of user equipment-initiated beam search for fifth generation new radio as generally related to a user equipment performing an uplink beam-scan to configure a new beam to reestablish beamformed communication with a base station in accordance with aspects of the techniques described herein.

FIG. 6 illustrates example method(s) 600 of user equipment-initiated beam search for fifth generation new radio as generally related to the user equipment 110 performing an uplink beam-scan to configure a new beam to reestablish beam-formed communication with the base station 121.

At block 602, a user equipment (e.g., the user equipment 110) determines that a first beam being used for wireless communication between the user equipment and a base station (e.g., the base station 121) is unsatisfactory for communication. At block 604, the user equipment transmits uplink beam-scan pilots that are effective to cause the base station to select a second beam for wireless communication.

At block 606, in response to transmitting the uplink beam-scan pilots, the user equipment receives a beam scan response message from the base station. At 608, based on information included in the received beam scan response message, the user equipment establishes wireless communication with the base station on the second beam.

Figure 7:
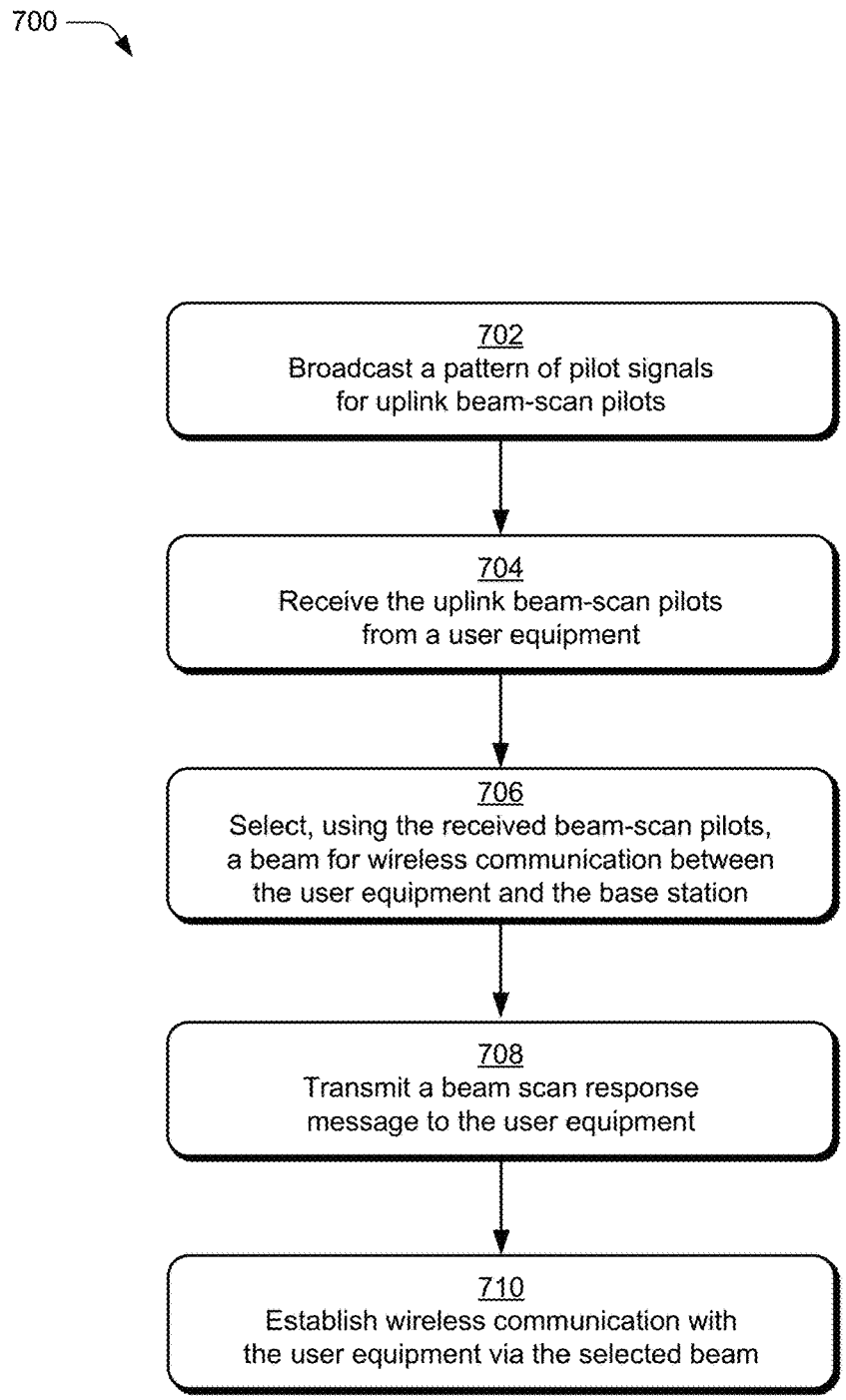
FIG. 7 illustrates an example method of user equipment-initiated beam search for fifth generation new radio as generally related to a base station performing uplink beam-scan to configure beam-formed communication with a user equipment in accordance with aspects of the techniques described herein.

FIG. 7 illustrates example method(s) 700 of user equipment-initiated beam search for fifth generation new radio as generally related to the base station 121 performing uplink beam-scan to configure beam-formed communication with the user equipment 110. At block 702, a base station (e.g., the base station 121) broadcasts a pattern of pilot signals for uplink beam-scan pilots. At block 704, the base station receives the uplink beam-scan pilots from a user equipment (e.g., the user equipment 110).

At block 706, the base station selects, using the received beam-scan pilots, a beam for wireless communication between the user equipment and the base station. At 708, the base station transmits a beam scan response message to the user equipment, including information that is effective to enable the user equipment to communicate with the base station using the selected beam. At 710, the base station establishes wireless communication with the user equipment via selected the beam.

Although aspects of user equipment-initiated beam search for fifth generation new radio have been described in language specific to features and/or methods, the subject of the appended claims is not necessarily limited to the specific features or methods described. Rather, the specific features and methods are disclosed as example implementations of user equipment-initiated beam search for fifth generation new radio, and other equivalent features and methods are intended to be within the scope of the appended claims. Further, various different aspects are described, and it is to be appreciated that each described aspect can be implemented independently or in connection with one or more other described aspects.

What is claimed is:

1. A method for beam-searching for a fifth-generation new radio (5G NR) communication link between a user equipment (UE) and a base station, the method comprising:

determining, by the user equipment, that a first beam being used for wireless communication between the user equipment and the base station is unsatisfactory for communication;

based on the determining, transmitting, by the user equipment, uplink beam-scan pilots, the transmitting being effective to cause the base station to select a second beam for wireless communication;

after transmitting the uplink beam-scan pilots, receiving a beam scan response message from the base station; and based on information included in the received beam scan response message, establishing, by the user equipment, wireless communication with the base station on the second beam.

2. The method of claim 1, further comprising:

transmitting, by the user equipment, an uplink scan request to the base station, the uplink scan request being transmitted before the uplink beam-scan pilots.

3. The method of claim 2, wherein the first beam is transmitted using a Fifth Generation New Radio (5G NR) radio access technology, and wherein the uplink scan request is transmitted using a Long Term Evolution (LTE) carrier radio access technology.

4. The method of claim 1, further comprising:

transmitting, by the user equipment, an uplink scan request to another base station, and wherein the other base station forwards the uplink scan request to the base station.

5. The method of claim 2, wherein the user equipment transmits the uplink scan request as a Random Access Channel (RACH) transmission using uplink beam scan-specific resources on a Physical Random Access Channel (PRACH).

6. The method of claim 1, further comprising:

determining, by the user equipment, that the first beam is unsatisfactory for communication based on one or more link quality parameters exceeding a threshold, wherein the one or more link quality parameters include: a received signal strength indication (RSSI), a bit error rate, a frame error rate, a signal-to-noise ratio, or a packet retransmission rate.

7. The method of claim 1, wherein the uplink beam-scan pilots comprise a pattern of pilot signals, and wherein the pattern includes one or more of a time, a periodicity, a frequency, or a sequence for transmission of the pilot signals.

8. The method of claim 7, wherein an indicator of the pattern of the pilot signals for the uplink beam-scan pilots is received via a broadcast signal from the base station.

9. The method of claim 7, wherein the pattern of the pilot signals for the uplink beam-scan pilots is negotiated between the user equipment and the base station using Radio Resource Control (RRC) signaling.

10. The method of claim 7, wherein the pattern of the pilot signals for the uplink beam-scan pilots is based on capabilities of the user equipment.

11. The method of claim 1, wherein the user equipment transmits the uplink beam-scan pilots at a maximum transmit power of the user equipment.

12. A user equipment (UE), the user equipment comprising:

a radio frequency (RF) transceiver;

an antenna array coupled to the RF transceiver; and a processor and memory system, coupled to the RF transceiver, to implement a beam search manager application configured to:

determine that a first beam being used for wireless communication between the user equipment and a base station is unsatisfactory for communication;
transmit, using the RF transceiver and the antenna array, uplink beam-scan pilots, the transmission being effective to cause the base station to select a second beam for wireless communication;
receive a beam scan response message from the base station indicating the second beam; and
based on information included in the received beam scan response message, establish wireless communication with the base station on the second beam.

13. The user equipment of claim 12, wherein the beam search manager application is configured to:
transmit an uplink scan request to the base station, before the transmission of the uplink beam-scan pilots.

14. The user equipment of claim 13, the user equipment comprising:
another radio frequency (RF) transceiver; and
the beam search manager application is configured to:
transmit the uplink scan request to the base station using the other RF transceiver.

15. The user equipment of claim 14, wherein the RF transceiver is a Fifth Generation New Radio (5G NR) transceiver, and wherein the other RF transceiver is a Long Term Evolution (LTE) transceiver.

16. The user equipment of claim 12, wherein the beam search manager application is configured to determine that the first beam is unsatisfactory for wireless communication based on one or more link quality parameters exceeding a threshold, the one or more link quality parameters including: a received signal strength indication (RSSI), a bit error rate, a frame error rate, a signal-to-noise ratio, or a packet retransmission rate.

17. The user equipment of claim 12, wherein the uplink beam-scan pilots comprise a pattern of pilot signals, and wherein the pattern includes one or more of a time, a periodicity, a frequency, or a sequence for transmission of the pilot signals, wherein the pattern of the pilot signals for the uplink beam-scan pilots is negotiated between the user equipment and the base station using Radio Resource Control (RRC) signaling, and wherein the pattern of the pilot signals for the uplink beam-scan pilots is based on capabilities of the user equipment.

18. The user equipment of claim 12, wherein the uplink beam-scan pilots correspond to transmission beams or transmission subarrays usable by the user equipment.

19. A method for beam-searching for a fifth-generation new radio (5G NR) communication link between a base station and a user equipment (UE), the method comprising:
broadcasting, by the base station, an indicator for a pattern of pilot signals for uplink beam-scan pilots;
receiving the uplink beam-scan pilots from the user equipment;
selecting, using the received uplink beam-scan pilots, a beam for wireless communication between the user equipment and the base station;
transmitting, by the base station, a beam scan response message including information that is usable by the user equipment to communicate with the base station using the beam; and
establishing, by the base station, wireless communication with the user equipment via the beam.

20. The method of claim 19, further comprising:
receiving, by the base station, an uplink scan request transmitted by the user equipment before receiving the uplink beam-scan pilots from the user equipment.

21. The method of claim 20, wherein the uplink scan request is received from another base station via an inter-base station interface.

22. The method of claim 20, further comprising:
receiving, by the base station, capabilities of the user equipment;
based on the receiving the capabilities of the user equipment, allocating, by the base station, uplink beam scan-specific resources; and
including an indication of the uplink beam scan-specific resources in the broadcast transmission.

23. The method of claim 19, wherein the pattern of pilot signals for uplink beam-scan pilots includes one or more of: a time, a periodicity, a frequency, or a sequence for transmission of the pilot signals.

24. The method of claim 19, further comprising:
receiving additional uplink beam-scan pilots from the user equipment;
selecting, by the base station, using the additional uplink beam-scan pilots, another beam for wireless communication between the user equipment and the base station;
transmitting, by the base station, another beam scan response message including additional information that is usable by the user equipment to communicate with the base station using the other beam; and
establishing, by the base station, wireless communication with the user equipment via the other beam.

* * * * *